No. 750,211. PATENTED JAN. 19, 1904.
W. C. MINER.
NUT LOCK.
APPLICATION FILED SEPT. 19, 1903.
NO MODEL.
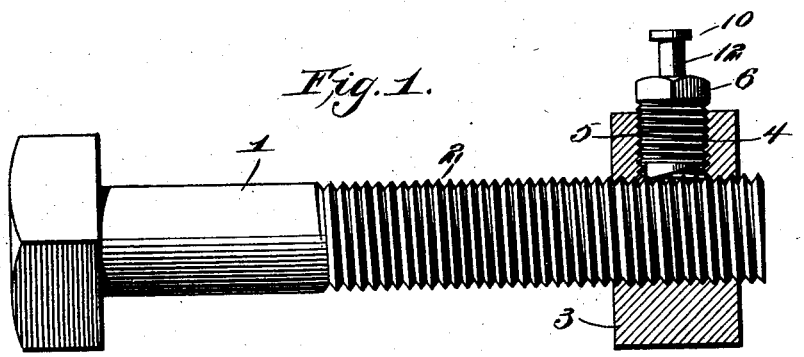
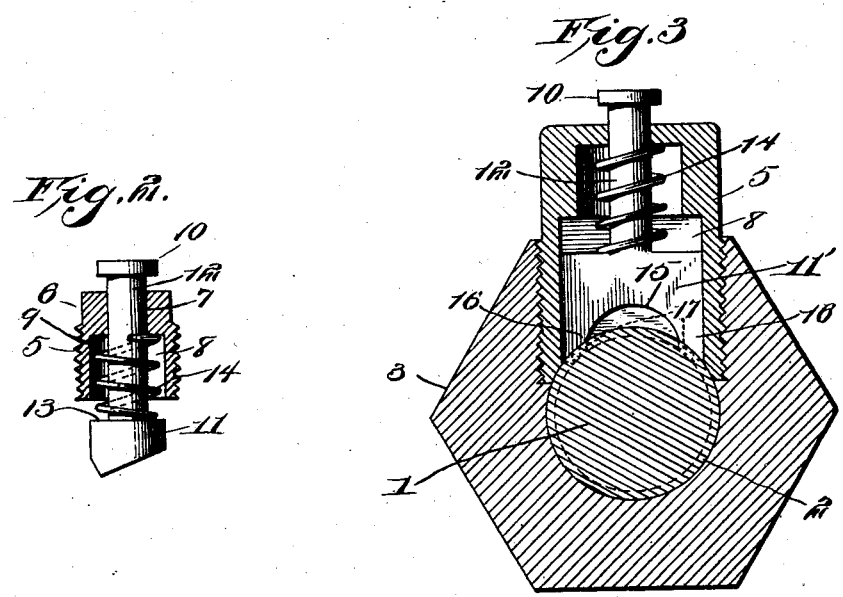
William C. Miner, Inventor
by C. A. Snow & Co., Attorneys
Witnesses No. 750,211. Patented January 19, 1904.

UNITED STATES PATENT OFFICE.

WILLIAM C. MINER, OF TRAVERSE CITY, MICHIGAN, ASSIGNOR OF ONE-HALF TO WILLIAM I. DE KAY, OF TRAVERSE CITY, MICHIGAN.

NUT-LOCK.

SPECIFICATION forming part of Letters Patent No. 750,211, dated January 19, 1904.

Application filed September 19, 1903. Serial No. 173,855. (No model.)

*To all whom it may concern:*

Be it known that I, WILLIAM C. MINER, a citizen of the United States, residing at Traverse City, in the county of Grand Traverse and State of Michigan, have invented a new and useful Nut-Lock, of which the following is a specification.

My invention relates to nut-locks, and has for its object to produce a device of this character of comparatively simple construction which will lock the nut firmly and securely upon the bolt, but may be readily manipulated for releasing the parts when desired.

To these ends the invention comprises the novel details of construction and combination of parts more fully hereinafter described.

In the accompanying drawings, Figure 1 is a side sectional elevation illustrating one form of embodiment of my invention. Fig. 2 is a detail sectional view, on an enlarged scale, of the locking device. Fig. 3 is a view illustrating another form of embodiment of my invention.

Referring to the drawings, 1 indicates a bolt having threads 2, and 3 the removable nut tapped onto the bolt and provided transversely through its side wall with an internally-threaded circular opening 4. These parts, except as herein specified, may be of the usual or any desired construction and material, inasmuch as they constitute no part of my invention.

In accordance with my invention I tap into the opening 4 a pressure member preferably in the form of a hollow or tubular externally-threaded plug 5, provided at its outer end with a squared tool-engaging portion 6, pierced by a central reduced circular opening 7, which leading from the main opening or cavity 8 produces a bearing-shoulder 9.

10 designates a longitudinally-movable engaging member carried by the pressure member and preferably comprising an enlarged head 11, beveled or otherwise shaped at its outer end for engagement with the bolt-threads 2, and a reduced shank or stem 12, which extends through the plug 5 and opening 7 and is headed at its outer end to prevent disconnection from the pressure member, there being formed between the shank and inner face of the head a bearing surface or shoulder 13. At this point it is to be noted that the head 11 is circular in cross-section and fits the opening 8 of the plug, while the shank 12 is likewise formed to fit the opening 7, thus providing for the engaging member being properly guided during movement in the plug.

14 is a normally expanded spring seated upon the stem 12 within the opening or cavity 8 and bearing at its ends upon the shoulders 9 and 13, respectively, the tendency of said spring being to force the head 11 outward from the plug for secure engagement with the threads 2.

In practice, the parts being assembled as in Fig. 1, the pressure member will be screwed tightly home in the opening 4, thus compressing the spring and causing the latter through its expansive action to force the locking member 10 into secure engagement with the bolt, as heretofore explained, it being understood, of course, that the member 10 will be prevented from rotation through such engagement during the operation of tightening or releasing the member 5. When, however, the latter member has been loosened sufficiently to relax pressure upon the spring 14, the outer end of stem 12 may be engaged and actuated for operating the member 10 to release the bolt and permit free movement of the nut, or if it be desired to entirely remove the locking device from the nut total disassemblage of the parts of the device will be prevented, as above explained, thus the device remaining intact for ready reëngagement.

In Fig. 3 I have illustrated another form of embodiment of the invention, in which all the parts are identical in construction and operation with those above described, with the single exception of the head 11', which in the present instance is in the form of a flattened substantially rectangular plate provided at its outer end with a curved recess 15, which conforms to the transverse sectional curvature of the bolt and produces a pair of fingers 16, provided upon their inner faces with teeth 17, which engage the bolt within the threads, thus securely locking the nut against movement.

From the foregoing it will be seen that I produce a device of simple construction which is admirably adapted for the attainment of the ends in view; but it is to be understood that I do not limit myself to the precise details herein set forth, inasmuch as minor changes may be made therein without departing from the spirit of the invention.

Having thus described my invention, what I claim is—

1. The combination with a nut adapted to be tapped on to a threaded bolt and having a transverse internally-threaded opening, of a pressure member removably tapped into said opening, an engaging member having a stem extended wholly through the pressure member and headed at its outer end, the inner end of the engaging member being formed for frictional engagement directly with the threads of the bolt, and a normally expanded spring mounted upon the stem and serving to press the engaging member into engagement with the bolt, said pressure member being freely adjustable longitudinally for varying the tension of the spring and the consequent pressure of the latter upon the engaging member.

2. The combination with a nut adapted to be tapped on to a threaded bolt and having a transverse internally-threaded opening, of a pressure member removably tapped into said opening, an engaging member having a stem extended wholly through the pressure member and headed at its outer end, a pair of toothed engaging fingers provided upon the inner end of the engaging member for frictional engagement directly with the threads of the bolt, and a normally expanded spring mounted upon the stem and serving to press the engaging member into engagement with the bolt, said pressure member being freely adjustable longitudinally for varying the tension of the spring and the consequent pressure of the latter upon the engaging member.

In testimony that I claim the foregoing as my own I have hereto affixed my signature in the presence of two witnesses.

WILLIAM C. MINER.

Witnesses:
 WM. H. UMLOR,
 M. W. UNDERWOOD.